United States Patent [19]

Chang et al.

[11] Patent Number: 4,480,802
[45] Date of Patent: Nov. 6, 1984

[54] SILENCER OF ANTI-REVERSE FISHING REEL

[76] Inventors: Paul P. H. Chang; Cheng-Hsiang Chu, both of Room 3, 7th Fl., No. 603, Tung-Hwa S. Rd., Taipei, Taiwan

[21] Appl. No.: 397,869

[22] Filed: Jul. 13, 1982

[51] Int. Cl.³ .............................................. A01K 89/00
[52] U.S. Cl. .................................. 242/84.2 R; 74/576
[58] Field of Search ...................... 242/84.1 R, 84.2 R, 242/84.21 R, 84.5 R, 84.51 R, 84.51 A, 219; 188/82.3, 82.34, 82.4; 74/576

[56] References Cited

U.S. PATENT DOCUMENTS

| | | | |
|---|---|---|---|
| 1,799,017 | 3/1931 | Junghans | 74/576 |
| 2,044,423 | 6/1936 | Dorer et al. | 74/576 X |
| 2,130,187 | 9/1938 | Jandus | 74/576 X |
| 4,163,528 | 8/1979 | Egasaki et al. | 242/84.21 R |
| 4,340,189 | 7/1982 | Volkert et al. | 242/84.1 R |

Primary Examiner—Stuart S. Levy
Assistant Examiner—David Werner
Attorney, Agent, or Firm—Cushman, Darby & Cushman

[57] ABSTRACT

A silencer of an anti-reverse fishing reel comprises a rubbing block adhered onto a catch which prevents the reverse rotation of a ratchet of the fishing reel and a buffer recess with a wide opening formed on the catch. Whenever normally rotating the ratchet of a fishing reel, the driving gear of the fishing reel will frictionally carry the rubbing block and the catch to a position outside the rotating radius of the ratchet teeth so as to eliminate the clicking sound generally produced between the ratchet and catch. The buffer recess has a wide opening on the catch providing a buffer space for releasing the catch from the ratchet teeth.

9 Claims, 10 Drawing Figures

SILENCER OF ANTI-REVERSE FISHING REEL

BACKGROUND OF THE INVENTION

Whenever winding the fishing line of a fishing reel a conventional ratchet R and catch C arrangement performs an anti-reverse function as FIG. 1 shows so as to prevent counter rotation in direction R1. The catch C is formed with a narrow recess C1 for the insertion of a spring plate S therein. While normally rotating the ratchet C in direction R2, the clicking sound produced when the ratchet strikes the catch will be transmitted into the water to scare the fish, adversely affecting the fishing. As some fishermen enjoy the silence of nature during fishing, the clicking sound created by the prior art reel ratchet may possibly bother the fishermen.

The present inventors have noted such phenomena and invented the present silencer for an anti-reverse fishing reel.

SUMMARY OF THE INVENTION

The object of the present invention is to provide a rubbing block adhered on a catch and a widely opened recess on the catch for the substantial disengagement of the ratchet from the catch during normal rotation of the fishing reel so as to silence the clicking of the reel.

DETAILED DESCRIPTION OF PREFERRED EMBODIMENTS

Figure 1:
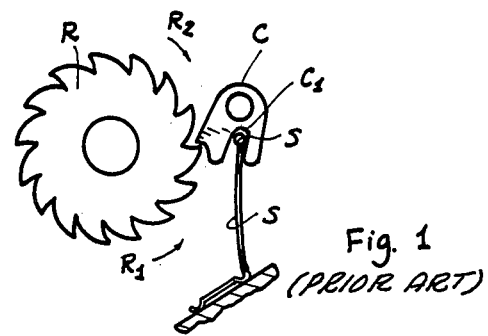
FIG. 1 is an illustration showing the ratchet and catch of a conventional fishing reel.
Figure 2:
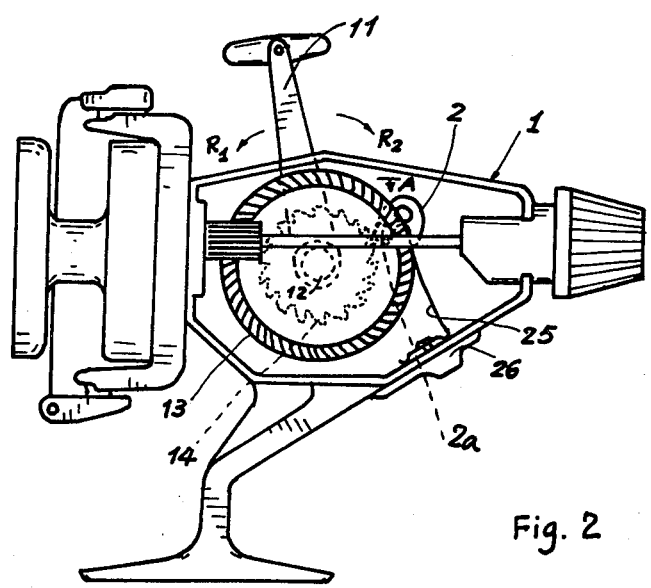
FIG. 2 is a side elevational view in section of a first presently preferred embodiment in accordance with the present invention.
Figure 3:
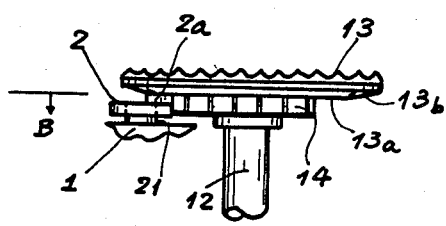
FIG. 3 is a top elevational view of the driving gear assembly shown in FIG. 2 taken from direction A.
Figure 4:
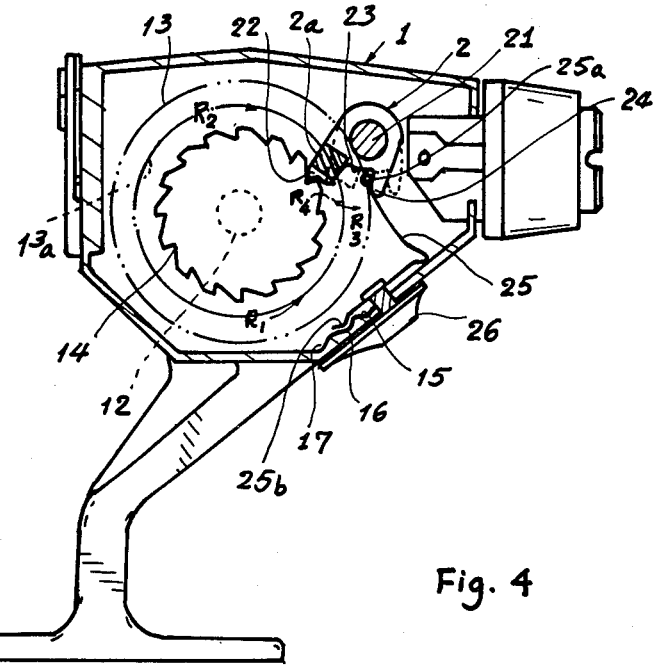
FIG. 4 is a side elevational view in section of the ratchet engaged with the catch in accordance with the present invention to have a silencing effect, the view taken from direction B of FIG. 3.

As shown in FIGS. 2, 3 and 4, the present invention comprises a rubbing block 2a adhered onto a catch 2 which performs an anti-reverse function for the ratchet 14. Ratchet 14 is formed beneath a driving gear 13 and rotated by a shaft 12 and a handle 11. The catch 2 comprises a catch shaft 21 pivotedly formed on reel 1, an inner anti-reverse hook 22 and an outer limiting hook 24. Hooks 22 and 24 form a buffer recess (a wide opening 23, therebetween.

Rubbing block 2a frictionally contacts a flat surface 13a of driving gear 13 and is formed sharply on inner anti-reverse hook 22 of catch 2. The block 2a may be made from any material having a good frictional surface or from plastic foams such as polyurethane (PU) foam or ethylene vinyl-acetate (EVA) foam.

A head portion 25a of a spring plate 25 is freely inserted into buffer. Spring plate 25 is lowerly formed with a hook portion 25b fixed on a sliding clutch 26. The hook portion 25b is movably engaged with either of the three grooves (a first groove 15, a second groove 16 and a third groove 17) formed on the casing wall of the reel.

When rotating the fishing reel 1 in direction R1 (as shown in FIG. 4) the inner anti-reverse hook 22 of catch compulsively interferes with ratchet 14 to prevent counter rotation of the reel 1 in direction R1. When normally rotating reel 1 in direction R2 for winding the fishing line, driving gear 13 will move catch 2 by frictionally carrying rubbing block 2a on catch 2 in direction R3 along catch shaft 21 to a dotted-line position (as is shown in FIG. 4) to release the outside the ratchet teeth so as to have a silencing effect (as no clicking will be created between ratchet 14 and catch 2). Buffer recess 23 provides a buffer space for stopping the movement of anti-reverse hook 22 on the head portion 25a of spring plate 25, thus separating from the ratchet teeth.

When re-rotating reel in direction R1, catch 2 with rubbing block 2a will be frictionally carried to a locking position (direction R4), depicted as full line in FIG. 4, to have a corresponding anti-reverse effect.

Hook portion 25b of spring plate 25 is movably engaged with either of the three grooves formed on the casing wall of reel 1 (a first groove 15, a second groove 16 and a third groove 17). As shown in FIG. 4, hook portion 25b is engaged with second groove 16 so as to allow the head portion 25a of spring plate 25 limiting the position of the outer hook 24 of the catch to cause inner hook 22 to lock with ratchet 14 for preventing the ratchet from rotating in a reverse direction.

Figure 5:
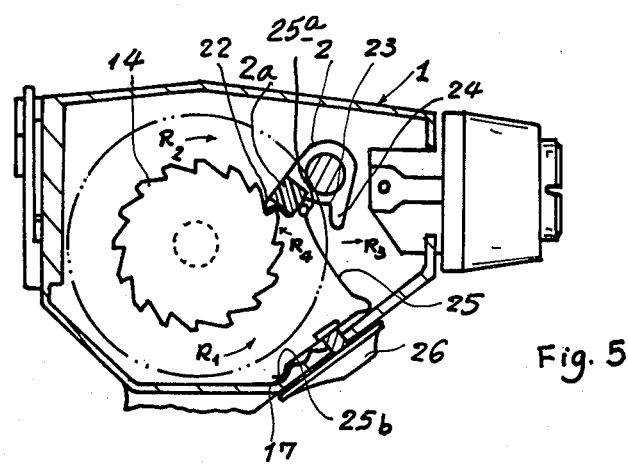
FIG. 5 is a side elevational view in section showing the anti-reverse condition operating in a mode wherein a clicking sound emanates therefrom.

When the hook portion 25b of spring plate 25 is engaged with third groove 17, as is shown in FIG. 5, the head portion 25a pushes inner hook 22 of catch 2 to lock ratchet 14 for preventing counter rotation R1. When normally rotating ratchet 14 in direction R2, a clicking sound will occur as the ratchet impacts catch 2 which is backed by spring plate 25. The clicking sound is used to indicate the rotation of reel 1 to someone used to the occurrence of the clicking sound during winding of the fishing line.

Figure 6:
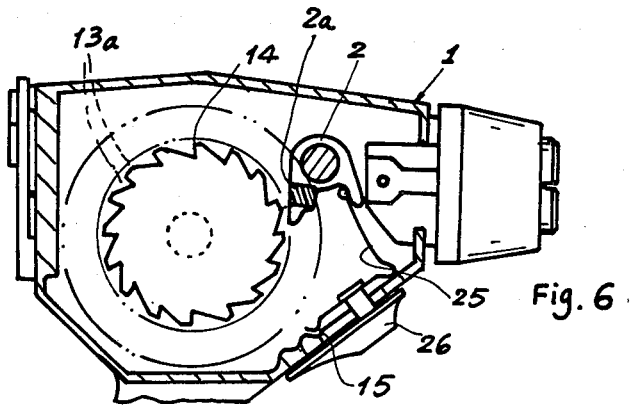
FIG. 6 is a side elevational view in section of the ratchet shown in FIG. 4 operating in a free rotation mode wherein free rotation is permitted.

In FIG. 6, hook portion 25b is shown engaged with first groove 15 so that spring plate 25 will retract catch 2 to release rubbing block 2a from the flat surface 13a of driving gear 13 to a position beyond the sloping surface 13b for free silent rotation of the ratchet.

Figure 7:
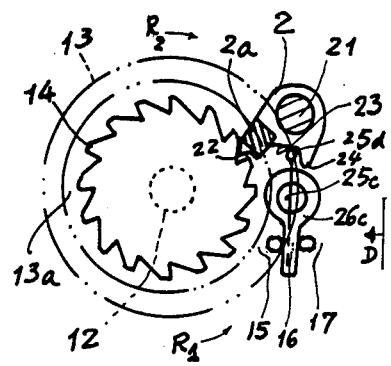
FIG. 7 is a side elevational view of of another preferred embodiment of a ratchet in accordance with the present invention.
Figure 8:
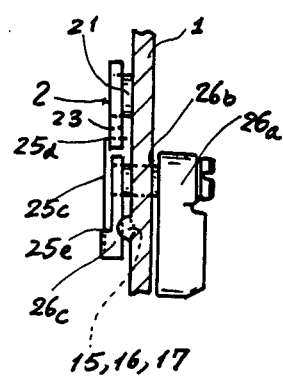
FIG. 8 is a side elevational view of the embodiment shown in FIG. 7 taken from direction D of FIG. 7.
Figure 9:
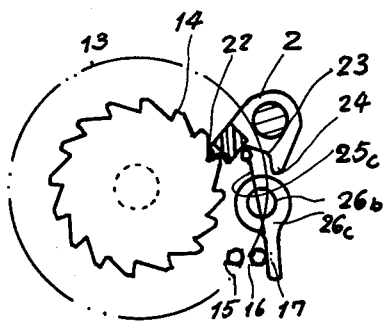
FIG. 9 is a side elevational view of a third preferred embodiment of a ratchet in accordance with the present invention.
Figure 10:
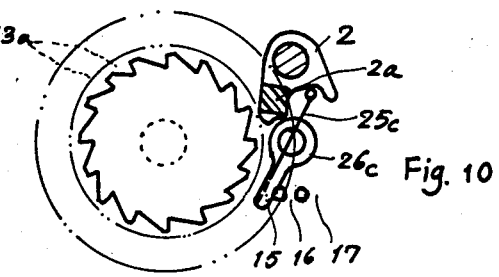
FIG. 10 is a side elevational view of the embodiment shown in FIG. 9 operating in a free rotation mode.

Another preferred embodiment of the present invention is shown in FIGS. 7 and 8, wherein the aforementioned sliding clutch 26 is substituted with a swing clutch 26a. The clutch 26a is connected with a clutch arm 26c by a pivot 26b. A spring wire 25c is disposed within recess 23 of catch 2 at its upper end 25d and is fixed on clutch arm 2 by its lower end 25e. When clutch arm 26c is engaged with the second recess 16 (as shown in FIG. 7), ratchet 14 will be silently rotated in direction R2 and will not be counter rotated in direction R1. This is similar to the mode of operation shown in FIG. 4. When clutch arm 26c is engaged with the third groove 17, ratchet 14 will be normally rotated with clicking sound but in an anti-reverse mode as shown in FIG. 9, which is similar to that shown in FIG. 5. If clutch arm 26c is engaged with the first groove 15 (as shown in FIG. 10) ratchet 14 will be rotated free and silently (as similar to that shown in FIG. 6.

We claim:

1. A fishing reel comprising:

a housing;

winding means, rotatably journalled to said housing and having a spool for storing a length of a filament, said winding means rotating in a winding direction, said filament winding onto said spool when said winding means rotates in said winding direction, said filament unwinding from said spool when said spool rotates in an unwinding direction;

disk means, rotatably journalled to said housing and operatively coupled to said winding means, for driving said winding means to rotate, said disk means rotatable in first and second directions, said first direction being opposite to said second direction, rotation of said disk means in said first direction driving said winding means to rotate in said winding direction, said disk means including means for defining a substantially flat surface;

transmission means for rotatably coupling said disk means to said winding means;

handle means, manipulatable by a user and operatively coupled to said disk means, for rotating said disk means;

ratchet wheel means, fixedly attached to said disk means, for rotating together with said disk means, said ratchet wheel means including means for defining a plurality of teeth;

catch means, pivotably journalled to said housing, for pivoting between a first and a second position, said catch means including means for defining a first extended portion, said first extended portion engagable with said teeth of said ratchet wheel means to prevent rotation of said ratchet wheel means in said second direction;

actuating means, manipulatable by the user, for selectively pivoting said catch means to one of said first and second positions; and rubbing block means, disposed on said first extended portion of said catch means and in slidable frictional contact with said surface of said disk means, for engaging said first extended portion with said teeth of said ratchet wheel means when said disk means rotates in said second direction and said catch means is pivoted in said first position, and for disengaging said first extended portion from said teeth when said disk means rotates in said first direction to prevent emanation of sounds resulting when said ratchet wheel means rotates while in contact with said first extended portion.

2. A fishing reel as in claim 1 wherein said rubbing block means comprises polyurethane foam.

3. A fishing reel as in claim 8 wherein said rubbing block means comprises ethylene vinyl-acetate foam.

4. A fishing reel as in claim 1 wherein said rubbing block means comprises a material having good frictional characteristics.

5. A fishing reel as in claim 1, wherein said rubbing block means comprises a material defining a good frictional surface.

6. A fishing reel as in claim 1, wherein said actuating means includes a spring plate means defining a hook portion which is operatively connected to a sliding clutch, said sliding clutch slidably disposed on said housing and manipulable by the user, said spring plate means for selectively engaging said catch means with said ratchet means, said hook portion of said spring plate means movably engagable with one of three grooves defined by a wall of said housing, said catch means pivoted to said second position when said hook portion is engaged with one of said second and said third grooves, said catch means pivoted to said first position when said hook portion is engaged with said first groove.

7. A fishing reel as in claim 6, wherein said spring plate means biases said first extended portion toward said ratchet wheel means to maintain said extended portion in engagement with said teeth while said ratchet wheel means rotates in said first direction despite the effect of said rubbing block means when said spring plate means is engaged with said third groove.

8. A fishing reel as in claim 6, wherein said first extended portion is disengaged from said teeth of said ratchet wheel means when said catch means is pivoted to said first position.

9. A fishing reel as in claim 6 wherein:

said spring plate means includes engaging head means for engaging with said catch means; and said catch means further includes means for defining a second extended portion, said first and second extended portions defining a recess therebetween, said engaging head means disposed in said recess.

* * * * *